United States Patent [19]

Marshall II, deceased

[11] 4,230,291
[45] Oct. 28, 1980

[54] TUNED SPRING-MASS VIBRATION ABSORBER

[75] Inventor: John Marshall II, deceased, late of Cheshire, Conn., by Richard N. James, agent

[73] Assignee: United Technologies Corporation, Hartford, Conn.

[21] Appl. No.: 913,720

[22] Filed: Jun. 7, 1978
(Under 37 CFR 1.47)

[51] Int. Cl.$^2$ .................. B64C 27/04; F16F 15/06
[52] U.S. Cl. ........................... 244/17.11; 188/1 B; 248/581; 248/618; 248/629; 267/136
[58] Field of Search .................. 244/17.11, 17.27; 188/1 B; 248/358 R, 358 AA, 20, 557, 560, 581, 592, 593, 595, 596, 605, 614, 618, 629; 267/136, 158, 160, 41, 54 R

[56] References Cited
U.S. PATENT DOCUMENTS
3,066,905  12/1962  Gertel .......................... 188/1 B X

*Primary Examiner*—Barry L. Kelmachter
*Attorney, Agent, or Firm*—Vernon F. Hauschild

[57] ABSTRACT

A tuned spring-mass vibration absorber in which a dynamic mass is suspended from a vibrating support member, such as a helicopter fuselage, by a plurality of cantilevered leaf springs integrally connected to the dynamic mass at selected stations so that the mass CG and the spring center of force are coincident, so that the springs are shaped to constitute a substantial part of the vibration absorber effective mass, and so that the springs are pivotally connected to the support member so as to impart no moments thereto.

8 Claims, 16 Drawing Figures

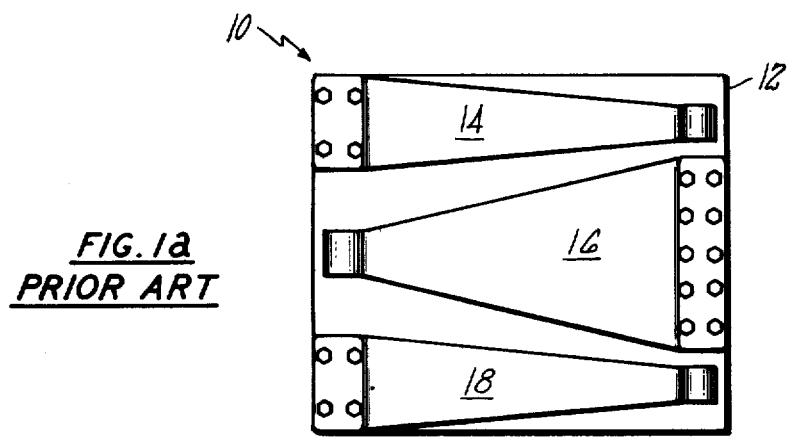
FIG. 1a PRIOR ART
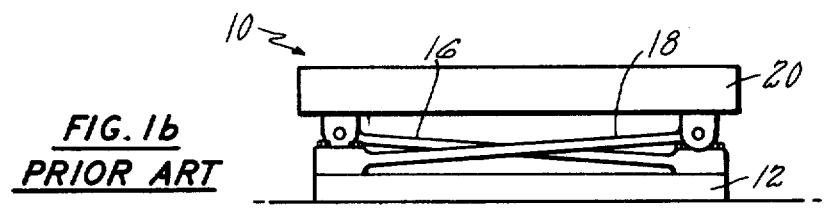
FIG. 1b PRIOR ART
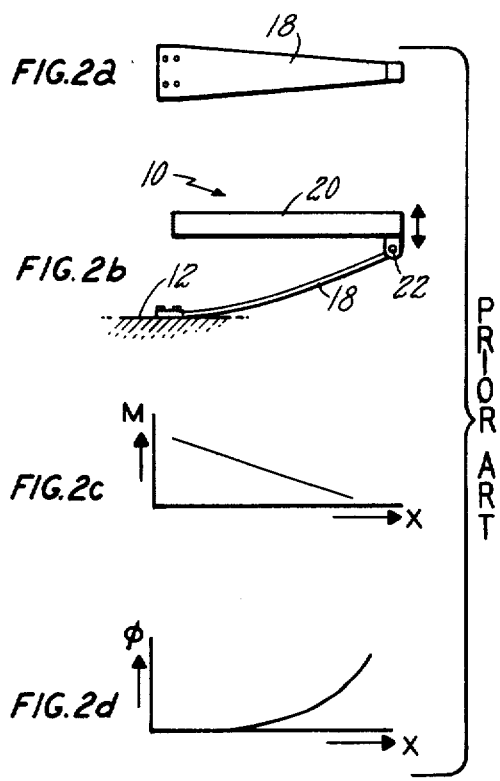
FIG. 2a
FIG. 2b
FIG. 2c
FIG. 2d
PRIOR ART
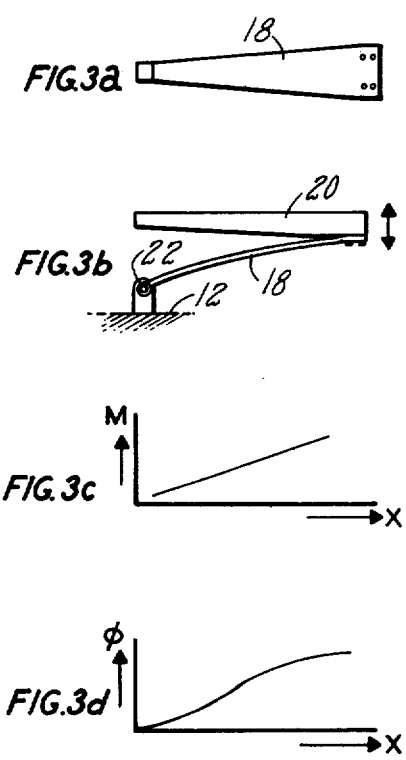
FIG. 3a
FIG. 3b
FIG. 3c
FIG. 3d

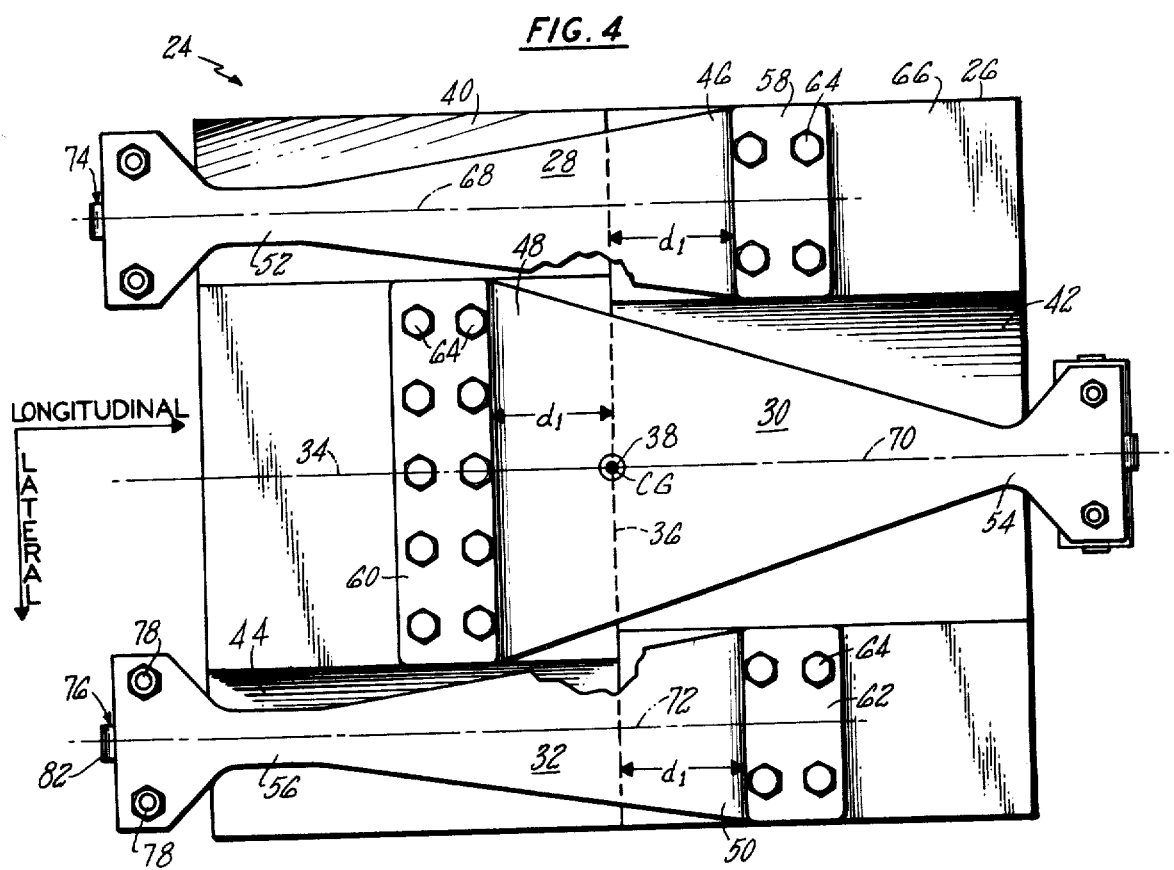
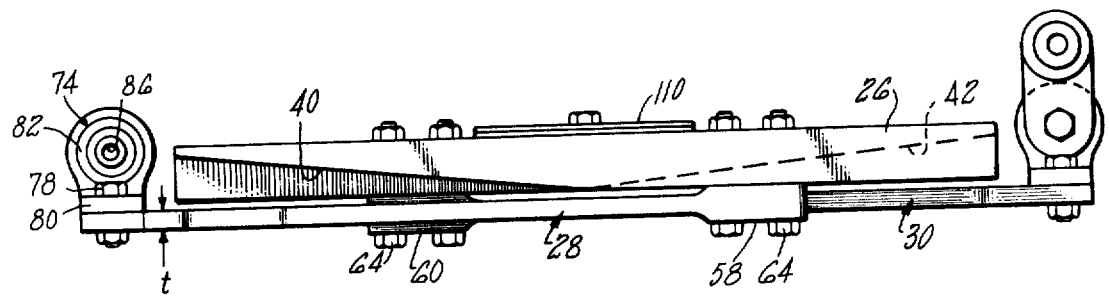

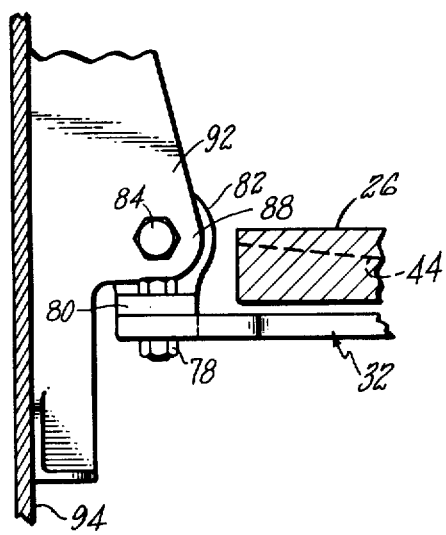
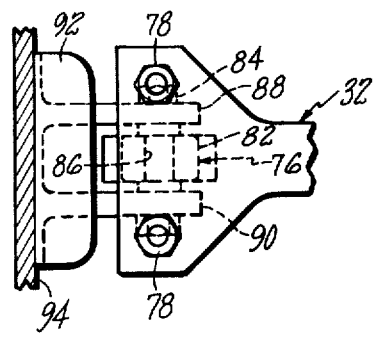
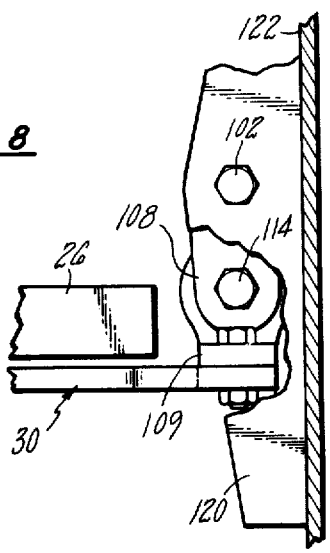
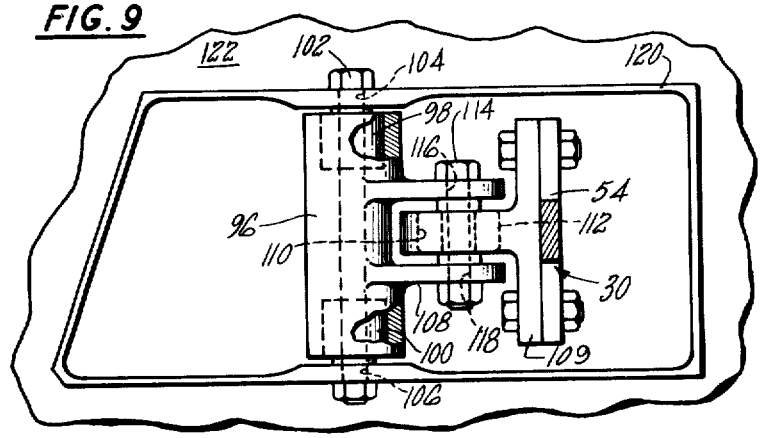

TUNED SPRING-MASS VIBRATION ABSORBER

The invention herein described was made in the course of or under a contract or sub-contract thereunder, with the Department of the Army.

BACKGROUND OF THE INVENTION

1. Field of the Invention

This invention relates to vibration absorbers of the type which are mounted in vibrating structures, such as a helicopter fuselage, and in which a dynamic mass is suspended from the fuselage by leaf springs for the purpose of cancelling fuselage vibrations at the point of attachment or remote therefrom.

2. Description of the Prior Art

For the past several years, such a prior art vibration absorber has used a dynamic mass supported from a frame member by a plurality of leaf springs of substantially triangular shape. The springs are connected to a frame member at their wide ends and pivotally connected to the mass member at their narrow ends, thereby producing a structure in which the leaf spring mass constitutes but a small part of the vibration absorber effective mass, in which the leaf springs impose a substantial moment on the support frame, which in turn imposes those moments on the helicopter fuselage, and in which the support frame reduces vibration absorber effectiveness by increasing damping therein.

SUMMARY OF THE INVENTION

A primary object of the present invention is to provide an improved tuned spring-mass vibration absorber for use in a helicopter fuselage wherein a dynamic mass is suspended from the fuselage by a plurality of cantilevered leaf spring members having a wide end integrally connected to the mass member and a narrow end pivotally connected directly to the fuselage, so that a substantial portion of the leaf spring mass forms part of the vibration absorber effective mass and so that the leaf spring imposes no reaction moments on the fuselage. The leaf springs are thus cantilevered from the mass member at their wide ends and pinned to the fuselage at their narrow ends.

In accordance with the present invention, a vibration absorber of reduced damping, weight and maintenance requirements is provided.

It is a further object of this invention to teach such a vibration absorber which is a symmetric system, that is, in which the center of force created by the leaf springs is at the same point or coincident with the dynamic mass center of gravity.

It is still a further object of the present invention to teach such a vibration absorber in which the leaf springs impose a symmetric force on the mass, in which all reaction loads are taken by the mass member, in which no moment reaction loads are imparted to the fuselage, and in which over seventy percent (70%) of the leaf spring mass forms part of the effective mass of the vibration absorber in determining vibration absorber efficiency, thereby increasing the effective mass of the vibration absorber about 10 percent.

BRIEF DESCRIPTION OF THE DRAWINGS

FIG. 1a is a top view of the prior art vibration absorber with the dynamic mass removed for purposes of illustration.

FIG. 1b is a side view corresponding to FIG. 1a but with the dynamic mass included.

FIG. 2a is a cross-sectional showing of a prior art absorber leaf spring.

FIG. 2b is a schematic representation of the prior art vibration absorber illustrating the method of attachment of one of the suspension springs.

FIG. 2c is a graph of this prior art vibration member in which spring mass per unit length is plotted against position along the spring.

FIG. 2d is a graph of this prior art vibration absorber in which suspension spring vertical displacement is plotted against position along the spring.

FIG. 3a is a showing of one of the leaf springs of my vibration absorber to illustrate its attachment to the dynamic suspended mass and the fuselage.

FIG. 3b corresponds to FIG. 2b and shows the attachment between one of my suspension springs, the dynamic mass and the fuselage.

FIG. 3c corresponds to FIG. 2c and relates to my vibration absorber and is a plot of spring mass per unit length against position along the spring to show that the mass per unit length of my absorber spring increases and is maximum at its point of connection to the dynamic mass.

FIG. 3d corresponds to FIG. 2d and is a plot of the suspension spring vertical displacement against position along the spring as it relates to my improved vibration absorber.

FIG. 4 is a plan view of my improved vibration absorber.

FIG. 5 is a side view of my improved vibration absorber shown in FIG. 4.

FIG. 6 is an enlarged showing of the connection between one of my side leaf springs and the fuselage.

FIG. 7 is a top view of the connection between one of my side leaf springs and the fuselage.

FIG. 8 is a side view of the connection between my center leaf spring and the fuselage.

FIG. 9 is a schematic representation of the subject matter of FIG. 8 showing the link arrangement between my center spring member and the fuselage.

DESCRIPTION OF THE PREFERRED EMBODIMENT

Referring to FIGS. 1a and 1b, we see the construction of the prior art vibration absorber upon which the present absorber is an improvement. It is deemed necessary to provide a description of this prior art absorber to permit a full description of the improvements of the present absorber thereover.

FIG. 1a is a top view of the prior art absorber with the dynamic mass removed and FIG. 1b is a corresponding side view thereof but including the mass. The prior art absorber 10 includes frame member 12 connected to the helicopter fuselage. Three triangularly-shaped leaf spring members 14, 16 and 18 are integrally connected to frame 12 by a bolt-flange connection at the wide ends thereof and are pivotally connected at their narrow ends to dynamic mass 20. Dynamic mass 20 is thus suspended from frame 12, and hence the helicopter fuselage shown in FIG. 1b, by leaf spring members 14, 16 and 18. While this prior art construction has been used in the aviation industry for a great many years, it has certain disadvantages which the vibration absorber taught herein overcomes.

An appreciation of the deficiencies of the prior art absorber can be appreciated by viewing FIGS. 2a–2d.

FIG. 2a represents one of the leaf springs of the prior art vibration absorber shown in FIGS. 1a and 1b in which the triangular leaf spring is integrally connected at its wider end to the frame member and is pivotally connected at its narrow end to mass 20 at pivot point 22.

The following two equations apply to the operation of leaf spring 18 in the FIG. 2 environment:

$$\phi = x^2 \div l^2 \qquad \text{Eq 1}$$

where $\phi$ = suspension spring displacement normalized to maximum of the spring.
where x = position along the spring, and
where l = total length of the spring.

The second such equation is:

$$M = \rho[(l-x)/l] W \times t \qquad \text{Eq 2}$$

where m = mass per unit length of the spring, and
where W = maximum width of spring
where t = thickness of spring,
where $\rho$ = material mass density of spring.

Now viewing view 2c, which is a plot of mass per unit length against position along the spring, it will be noted that the mass per unit length of spring 18 is maximum at its wide end where it connects to frame 12 and minimum at its thin end where it connects to dynamic mass 20. By viewing graph 2d, it will be noted that leaf spring displacement squared, $\phi^2$, is minimum at its point of attachment to frame 12 and maximum at its point of attachment to mass 20. It will be noted by viewing FIGS. 2c and 2d that where mass is minimum, spring deflection squared is maximum.

A third equation which is applicable to the operation or characteristics of spring 18 shown in the prior art constructions of FIGS. 2a–2d is:

$$\text{Effective spring mass of the spring} = \int_{\text{spring}} m\phi^2 \, dx \qquad \text{Eq. 3}$$

It can be shown that Equation 3 solves to 1/15 the mass of spring 18. In other words, but 1/15th of the mass of spring 18 in this prior art construction becomes effective mass in determining the efficiency of the vibration absorber 10 shown in FIGS. 2a–2d.

The teaching of my invention is to improve the efficiency of such a prior art vibration absorber by reversing the orientation of the lead springs to obtain the advantages shown in FIGS. 3a–3d. As shown in FIG. 3a, our triangularly-shaped leaf spring, which we shall continue to identify as 18, is pivotally connected at its narrow end directly to the fuselage at pivot point 22 and integrally and fixedly connected at its wide end to dynamic mass 20.

With spring 18 mounted as shown in FIGS. 3a and 3b, the following equation can be utilized to describe the operation of each:

$$\phi = x(2-x) \div l^2 \qquad \text{Eq 4}$$

where $\phi$ = suspension spring displacement normalized to maximum displacement of the spring.
where x = position along the spring, and
where l = total length of the spring.

Further, the following equation can also be utilized to describe the operation of spring 18 in the FIG. 3b environment:

$$m = \rho(x/l)w \, t \qquad \text{Eq 5}$$

where m = mass per unit length of the spring
where x = position along the spring, and
where W = maximum width of spring
where $\rho$ = material mass density of spring
where t = thickness of spring.

Now referring to FIG. 3c, we see that the mass m of spring 18 increases substantially as it approaches its point of fixed attachment to mass 20 so that it is maximum at that point and minimum at its point of pivoted attachment 22 to frame 12. Similarly, as best shown in FIG. 3d, the displacement squared $\phi^2$ of spring 18 is maximum at its point of attachment to mass 20 and minimum at its pivot point 22 attachment to frame 12. By viewing FIGS. 3c and 3d it will be seen that spring mass and spring displacement are maximum at the point of attachment to dynamic mass 20.

In the FIG. 3a–3d construction, the effective spring mass can again be represented by the equation:

$$\text{Effective spring mass} = \int_{\text{Spring}} m\phi^2 \, dx \qquad \text{Eq. 6}$$

For the FIG. 3 construction, the effective spring mass equals 11/15 of mass of spring 18. It will therefore be seen by viewing FIGS. 2a–2d and comparing these FIGS. with FIGS. 3a–3d, that in the prior art construction shown in FIGS. 2a–2d, only 1/15 of the weight of the spring 18 forms part of the effective spring mass. The effective mass of vibration absorber would be the sum of the effective spring mass, the weight of mass member 20 and the weight of the spring-to-mass connecting mechanism 22. By comparison, it will be noted that in my vibration absorber shown in FIG. 3, 11/15 of the mass of the leaf spring becomes part of the effective mass of the vibration absorber. This is one of the advantages of my vibration absorber over the prior art, and I will now describe my vibration absorber in detail. It will therefore be seen that 73% of the leaf springs total mass of my absorber form effective mass of the absorber and the leaf springs of the prior art absorber contribute 7% of the leaf springs mass to the effective mass of the absorber. Had coil springs been used, 33% of spring mass would be effective.

As best shown in FIGS. 4 and 5, my vibration absorber 24 comprises dynamic suspended mass member 26 suspended from the fuselage by three cantilevered leaf spring members 28, 30 and 32. Mass member 26 is rectangular in cross section and has longitudinal axis 34 and lateral axis 36 intersecting at mass center of gravity and geometric center 38, which are located at the center of the rectangular plan form. Mass member 26 is preferably a rectangular plate of constant thickness, but includes clearance cutouts 40, 42 and 44 to accommodate the motion of leaf spring members 28, 30 and 32, respectively, so that they do not impinge against mass member 26 during vibration absorbing operation.

Each of the leaf springs 28, 30, 32 have a wide end 46, 48 and 50, respectively, and a narrow end 52, 54 and 56, respectively. Each spring tapers smoothly between its wide and narrow end. Leaf springs 28, 30, 32 are preferably, but not necessarily, triangular in cross section and are of constant thickness t so that constant stress is experienced in the springs to minimize their weight. As best shown in FIG. 4, the wide ends of leaf springs 28, 30, 32 are integrally connected to flat, rectangular flange members 58, 60 and 62, respectively, each of which flanges is connected by a double row of bolts, such as 64, to a flat surface 66 on dynamic mass member 26, which has holes therein aligned with the bolt holes of flange members 58, 60, 62. Leaf springs 28, 30 and 32 and 34 are thus cantilevered from mass 26. This construction allows transmission of forces and moments in all directions between the springs and the mass. Center leaf spring 30 is twice the width and stiffness of side leaf springs 28 and 32, and each spring is symmetric about its central axis 68, 70 and 72, respectively. Side springs 28 and 32 are identical in all respects and are oriented in the opposite direction longitudinally with respect to mass member 26 from center spring 30. As best shown in FIG. 4, central axis 70 of center spring member 30 extends along mass member longitudinal axis 34, while central axes 68 and 72 of springs 28 and 32 are positioned equidistant on opposite lateral sides thereof and of mass cg 38 and parallel with central axis 70. It will further be noted by viewing FIG. 4 that central spring 30 connects to mass member 26 at distance $d_1$ from mass cg 38 and lateral axis 36, and that side spring members 28 and 32 connect to mass member 26 at the same distances $d_1$ but on the opposite side of mass cg 38 and mass lateral axis 36 so that axes 68 and 72 are equidistant from axes 70 and 34. The springs 28, 30, 32 therefore provide a triangular support for mass 26 and the force the springs impose on the mass is symmetric. The elastic restoring force generated by the springs resulting from vertical motion of mass 26 will be centered at mass cg 38. The location of the mass cg and the center of force of the springs are at the same point, and the motion and forces of the absorber are symmetrical. The normal motion of the absorber is pure vertical motion of the mass, which causes parabolic deflection of the leaf springs.

Side leaf springs 28 and 30 are identical in all respects and connect to the fuselage through spherical bearing members 74 and 76, best shown in FIGS. 6 and 7, which depict the connection of side spring member 32. Referring to FIG. 6, we see that leaf spring 32, by appropriate connection such as bolt members 78, has fitting 80 suspended therefrom, which fitting supports the outer race 82 (see FIG. 4) of spherical bearing 76. Bolt member 84 extends through aligned holes, including hole 86 (see FIG. 4) in the inner race of spherical bearing 76 and corresponding holes in flange members 88 and 90, which project from fitting 92, which is connected in conventional fashion to a fuselage bulkhead 94. The narrow ends of side springs 28 and 32 are connected to the fuselage in an identical fashion and, due to this spherical ball connection, vertical, lateral and longitudinal shear forces are imparted by the springs to the fuselage, but no moment reactions are imposed on the fuselage by the springs.

As best shown in FIGS. 8 and 9, the narrow end of central leaf spring member 30 is connected to the air frame or fuselage in a different fashion from side springs 28 and 32. In any convenient fashion, barrel portion 96 of link 108 is pivotally suspended from the fuselage frame 120 and serves to support the outer races of roller or ball bearings 98 and 100. Bolt member 102 extends through the inner races of bearings 98 and 100 and also through aligned holes 104 and 106 in frame 120. Link member 108 is shaped as shown in FIG. 9 and defines apertures 116 and 118 to bolt member 114. Bolt member 114 also passes through the inner race of spherical bearing 112, which is supported in aperture 110 of member 109, which is connected in any convenient fashion to narrow end 54 of leaf spring 30. In this fashion, central spring 30 is connected to the fuselage through link member 108 so that vertical, lateral and longitudinal shear forces only are imparted by spring 30 to the fuselage, while no moment reaction is imparted from the spring 30 to the fuselage. Link 108 restrains center spring 30 in vertical and lateral directions only, the center spring 30 is free to move in a longitudinal direction at its point of connection to the fuselage. The purpose of this longitudinal motion freedom is to allow for the shortening effect of the large bending deflections of the end spring. This is called a pantographing effect of the absorber.

Vibration absorber 24 may be fine tuned by the attachment of any selected number of tuning weights, such as 110, to mass 26. (See FIG. 5).

To best understand the significance of the construction of my vibration absorber and its advantages over the prior art, it is deemed advisable to define the functions of a vibration absorber.

A vibration absorber is a passive device installed in a helicopter or other vibrating mechanism, and is constructed so that it provides a force at its point of attachment to the helicopter fuselage which forces the vibration of the helicopter to zero at the point of attachment. Basically, the vibration absorber consists of a mass attached to the fuselage by a spring or spring system. By proper selection of the mass of the suspended mass and the spring rate, the natural frequency of the vibration absorber can be established to be equal to the frequency of the vibration at its point of attachment to the helicopter to thereby produce vibration cancellation.

The natural frequency of the vibration absorber can be represented by the following equation:

$$W = \sqrt{K/m} \qquad \text{Eq (7)}$$

where W is the natural frequency of the vibration absorber,

K is the suspension spring vertical bending stiffness and m is the mass of the suspended mass.

The vibration absorber is designed so that its natural frequency W is equal to $W_f$, the so-called forcing frequency, which is the frequency of response of the helicopter fuselage at the point of attachment of the vibration absorber. This relationship between absorber natural frequency W and the attachment point response frequency $W_p$ produces the desired cancellation at the fuselage attachment point. The stiffness of the absorber is the sum of the stiffness of the three suspension spring members.

Viewed another way, the vibration absorber is used to solve a problem. That problem is excessive vibration at a particular frequency in the fuselage, which is typically the blade passage frequency. The natural frequency of the absorber is designed to be equal to the problem frequency in the helicopter so that the vibration absorber vibrations at its designed natural frequency and the vibrations of the helicopter at its vibration problem frequency are cancelling at the point of attachment between the vibration absorber and the fuselage.

It is important to note that the vibration absorber taught herein can also be used as a remote vibration absorber in which it is designed to produce an absorber natural frequency which will cancel problem vibrations in the fuselage at some point other than its point of attachment to the fuselage. For example, the vibration absorber might be mounted in the nose of a helicopter, but is designed to serve to minimize cockpit vibrations, the cockpit being remote from the location of the vibration absorber. The remote vibration absorber works by interaction with the natural modes of vibration of the fuselage and selective tuning of the absorber in the helicopter can produce a cancellation of the vibrations in the helicopter due to these natural modes at points remote from the vibration absorber.

The prior art vibration absorber will now be discussed to bring out its disadvantages which my vibration absorber overcomes. It will be noted that the prior art vibration absorber shown in FIGS. 1a and 1b includes a frame member 12, which is connected to the fuselage. The three leaf springs are bolted to that frame and project therefrom in cantilever fashion and are connected to the suspended mass 20 to form this prior art vibration absorber. In the FIG. 1a, 1b prior art construction, the base of the leaf spring members are bolted to the frame 12, which is, in turn supported from the fuselage, while the apex of the spring members are attached to the mass 20 through bearings. This prior art vibration absorber has been in use for a number of years on production helicopters and, in one such helicopter, the electric battery for the helicopter serves as, or as part of, the suspended mass, and hence that absorber became known as the "battery absorber."

One of the disadvantages of this prior art construction is that displacement of mass 20 causes a shear force at the apex or narrow end of the leaf springs. This shear force is reacted by a shear force and in a bending moment at the point of attachment of the wide end of each leaf spring to the frame 12. So that the frame of the prior art construction is able to react or carry this shear force and the large bending moments imposed thereon by the three leaf springs, the frame would have to be very stiff and hence heavy. In this prior art construction, a compromise had to be reached because if the frame were made as stiff and heavy as would be required to react the large bending moments, the weight thereof would have been totally unacceptable for aircraft use. In this prior art construction, accordingly, the frame member had of necessity to have substantial flexibility and this frame flexibility presented wear problems at the points of attachment of the frame to the fuselage.

It will be noted that in my vibration absorber described supra, the arrangement of the springs have been inverted so that the wide end of each spring is fixedly attached to the suspended mass while the narrow end of each spring is pivotally attached directly to the fuselage, thereby eliminating the need for the prior art frame member, its weight and the wear problems which the flexibility thereof created. Not only does my vibration absorber eliminate the prior art frame, and its attendant disadvantages, but also, as described above, a substantially larger portion of the mass of the springs becomes part of the effective mass of the vibration absorber system. It can be established that the effectiveness of a vibration absorber is proportional to the so-called "effective mass" of the vibration absorber. Effective mass can be defined as the force produced by the absorber per unit of acceleration of the mass. The larger the effective mass, the more effective the absorber because this results in lower vibration level at the vibration absorbers point of attachment to the fuselage and the vibration absorber is effective over a wider range of helicopter vibration frequencies. As stated earlier, in my vibration absorber 11/15 of the mass of the leaf springs form part of the vibration absorber effective mass, while in the prior art construction only 1/15 of the spring mass forms part of the absorber effective mass. My vibration absorber accordingly produces improved effectiveness for the same size and weight absorber. This advantage can be expressed another way, namely, that for a 60 lb. vibration absorber of my design, the suspension springs weigh 13 lbs., constituting a weight reduction of 8 lbs. over the prior art absorber while providing the same absorber effectiveness. With my construction, the spring weight was reduced by 60%. As a practical example, when my vibration absorber is used in a particular current Sikorsky Aircraft helicopter in place of the prior art absorber, the effective mass of the vibration absorber system is increased by 10% in view of my vibration absorber construction.

A second advantage of my vibration absorber over the prior art is that while the prior art absorber had utilized a frame member 12 to react bending moments from the leaf springs, in my construction, these bending moments generated in the leaf springs are reacted directly by the suspended mass 24 which can be constructed to be very rigid since it is required to be of at least a given mass. For example, the mass 26 per se in a current Sikorsky Aircraft helicopter is 50 pounds and is made from a 1 inch thick steel plate.

Further, in my construction, the narrow ends of the leaf springs react only a vertical shear force, and not the large bending moments of the prior art construction, and therefore my leaf springs can be attached directly to the fuselage structure and hence the prior art structure frame 12 is not required in my construction. The elimination of the frame can be shown to reduce vibration absorber weight by 12%. A further advantage to be gained by elimination of the frame is the elimination of the deflection of the frame and the friction losses which it produced in the prior art system. In my vibration absorber, elimination of the frame reduces the friction losses in the vibration absorber system and also improves effectiveness of the absorber by reducing damping of the absorber. The importance of this is realized when we consider that the effectiveness of the absorber is inversally proportional to the damping of the vibration absorber system. Damping is defined as the energy loss per cycle of vibration of the absorber and such an energy loss is the friction created in the frame 12 of the prior art absorber because the frame is a built-up structure held together by various fasteners.

In a vibration absorber, there are essentially three areas where energy is lost. The first is the structural damping of the leaf springs . The second is the friction in the absorber bearings, and the third is the loss in the frame discussed above. By eliminating the frame of the prior art construction, the energy losses in my vibration absorber have been reduced by 30 to 50% over the prior art construction with frame 12.

A still further advantage to be gained by the elimination of the prior art frame is that my vibration absorber is installed and held in position by only three bolts, with each of the three bolts serving to attach the narrow end of one of my leaf springs to the helicopter fuselage. This three-bolt attachment system of my vibration absorber compares favorably with the attachment systems of the prior art absorber which utilized anywhere from 4 to 32 bolts or fasteners. This not only saves weight but reduces maintenance time when the absorber has to be inspected, repaired or replaced on the aircraft. The vibration absorber 24 is thus located vertically and laterally by these three attachment bearings or bolts, and axially by the two fittings at the ends of the side springs 28 and 32 only.

Because of the shape of the suspension springs in my vibration absorber, the vibration absorber system is very stiff in the lateral and longitudinal direction and will thus vibrate only in the intended vertical direction.

While the mass member 26 may move in angular motion, the geometry of the attachments in my vibration absorber cause the angular natural modes to be at frequencies which are much higher than the vertical natural modes, and thus will not interfere with vibration absorber operation. In addition, the symmetry of my system minimizes the excitation of these angular vibration modes.

It will therefore be seen that my vibration absorber provides improvements over the prior art vibration absorber in that a substantially greater portion of the suspension spring mass becomes part of the vibration absorber effective mass, and thereby increases vibration absorber efficiency and effectiveness over a wider range of forcing vibrations, and eliminates the bending moments which the prior art springs impose upon the prior art frame and fuselage, thereby permitting the elimination of the prior art frame with its attendant disadvantages in weight and damping, and permits direct connection of the suspending spring members to the helicopter fuselage free of moment reaction.

I wish it to be understood that I do not desire to be limited to the exact details of construction shown and described, for obvious modifications will occur to a person skilled in the art.

I claim:

1. A tuned spring-mass vibration absorber adapted for use in a helicopter fuselage comprising:
    (A) a dynamic mass member of selected mass and shaped to define at least one flat surface and a selectively positioned mass center of gravity,
    (B) means suspending said dynamic mass member from the fuselage comprising:
        (1) three leaf spring members comprising a center spring member with side spring members on opposite sides thereof and each spring member being of constant thickness and having a wide end and tapering gradually therefrom to a narrow end and extending in parallel relationship to one another and with the width of the center spring member being twice that of the side spring members and with the center spring member being oriented in the opposite direction to the side spring members,
        (2) first means pivotally connecting the narrow ends of said leaf spring members to the fuselage so that no moment reactions are imparted to the fuselage from the spring members, and
        (3) second means rigidly connecting the wide ends of said spring members to said mass member flat surface and at stations in spaced relation to the mass member center of gravity so that said mass member is suspended from said spring members for vertical motion with respect to the fuselage.

2. A vibration absorber according to claim 1 wherein said dynamic mass member is a basically flat member of rectangular cross section having a longitudinal axis and lateral axis and shaped so that the mass center of gravity is at the geometric center thereof, and wherein the said center spring member is connected to the mass member a selected distance from the mass center of gravity, and wherein said side spring members are connected to the mass member a selected distance on the opposite side of the mass center of gravity.

3. A vibration absorber according to claim 2 wherein said mass member longitudinal and lateral axes pass through the mass center of gravity and geometric center, wherein each of said spring members has a central axis about which each said spring member is symmetric and wherein said spring members are positioned so that their central axes are parallel and parallel to the mass member longitudinal axis, further wherein the central axis of said center spring member extends along said mass member longitudinal axis, and the central axis of said end spring members are positioned equidistant on opposite sides of said mass member longitudinal axis, and wherein said second connecting means connects the wide end of said center spring member to said mass member a selected distance from said mass member lateral axis and wherein said second connecting means connects the wide ends of each of said side spring members to said mass member at the same selected distance on the opposite side of said mass member lateral axis, and at equal distances on opposite sides of said mass member longitudinal axis.

4. A helicopter according to claim 1 wherein said first connecting means connects said spring members to said fuselage so that said mass member is able to move along said longitudinal axis relative to the fuselage.

5. A vibration absorber according to claim 4 wherein said second connecting means comprises flange members intergally connected to the wide ends of each of said spring members so as to be oriented parallel to said mass member flat surface and having two parallel rows of bolt holes passing therethrough parallel to said mass member lateral axis, and bolt members passing through said aligned holes in said flange members and said mass member so that all forces and moments may be transmitted between said mass member and said spring members in all directions.

6. A vibration absorber according to claim 5 wherein said mass member includes beveled portions shaped to the shape of the spring members so that said mass member is able to move relative to said fuselage without interference from said spring members.

7. A vibration absorber according to claim 1 wherein said first means connects said spring members and hence said vibration absorber to the fuselage directly at three points of attachment therebetween, and wherein said first means includes three bolt members whose insertion or removal mounts or removes the vibration absorber from the fuselage.

8. A vibration absorber according to claim 7 wherein said first means comprise spherical bearing connections between the spring member narrow end and the fuselage.

* * * * *